(12) United States Patent
Roy et al.

(10) Patent No.: US 9,363,375 B1
(45) Date of Patent: Jun. 7, 2016

(54) INTERACTION USING CONTENT

(75) Inventors: Ashutosh Roy, Los Altos, CA (US);
Promod Narang, Los Altos, CA (US);
Sam Hanh, Saratoga, CA (US)

(73) Assignee: EGAIN COMMUNICATIONS,
Mountain View, CA (US)

(*) Notice: Subject to any disclaimer, the term of this patent is extended or adjusted under 35 U.S.C. 154(b) by 397 days.

(21) Appl. No.: 13/271,960

(22) Filed: Oct. 12, 2011

Related U.S. Application Data

(60) Provisional application No. 61/392,375, filed on Oct. 12, 2010.

(51) Int. Cl.
*H04M 11/00* (2006.01)
*H04M 3/51* (2006.01)

(52) U.S. Cl.
CPC .......... *H04M 3/5191* (2013.01); *H04M 3/5166* (2013.01)

(58) Field of Classification Search
CPC .............. H04M 1/253; H04M 1/2535; H04M 3/42–3/42187; H04M 3/42382; H04M 3/5166; H04M 7/0024–7/006; H04M 2201/42; H04M 2201/50; H04M 2201/52; H04M 2203/25–2203/258; H04M 2203/65–2203/658; H04W 88/00–8/188; G06F 3/048–3/0486
USPC ................ 370/259–271, 351–357; 379/265.01–266.1, 90.01–93.01, 379/93.12–93.25, 114.1–114.13, 201.01, 379/202.01–207.01, 260–267, 67.1–88.28; 704/270–278; 709/201–207, 217–248; 348/14.01–14.16; 455/412.1–426.2, 455/456.1–466, 550.1–560, 575.1–575.9, 455/90.1–90.3
See application file for complete search history.

(56) References Cited

U.S. PATENT DOCUMENTS

| | | | |
|---|---|---|---|
| 6,295,551 B1 | 9/2001 | Roberts et al. | |
| 6,311,231 B1 * | 10/2001 | Bateman et al. | 379/265.09 |
| 6,418,199 B1 * | 7/2002 | Perrone | 379/88.01 |
| 6,580,904 B2 * | 6/2003 | Cox et al. | 455/456.2 |
| 6,654,457 B1 | 11/2003 | Beddus et al. | |
| 6,665,395 B1 | 12/2003 | Busey et al. | |
| 6,714,536 B1 * | 3/2004 | Dowling | 370/356 |
| 6,741,586 B1 * | 5/2004 | Schuster et al. | 370/352 |
| 6,823,370 B1 * | 11/2004 | Kredo et al. | 709/206 |
| 6,920,425 B1 * | 7/2005 | Will et al. | 704/275 |
| 6,983,307 B2 * | 1/2006 | Mumick et al. | 709/205 |
| 7,054,939 B2 * | 5/2006 | Koch et al. | 709/227 |
| 7,117,152 B1 * | 10/2006 | Mukherji et al. | 704/235 |
| 7,203,188 B1 * | 4/2007 | Siegrist et al. | 370/352 |
| 8,027,458 B1 * | 9/2011 | Pollock | 379/265.12 |
| 8,139,725 B2 * | 3/2012 | Cohen et al. | 379/88.14 |
| 8,175,249 B2 * | 5/2012 | Elsey et al. | 379/218.02 |

(Continued)

*Primary Examiner* — Hemant Patel

(57) ABSTRACT

A method, computer-readable medium and system for interacting using content are disclosed. A web response may be executed on a first computer system and/or another computer system associated with the first computer system responsive to the initiation of a call over a voice channel between the first computer system and a second computer system. The web response may include automatically downloading content over a data channel so that it can be automatically presented at the first computer system and/or another computer system associated with the first computer system. The content may include video, audio, information from a social networking website, a blog, other content, some combination thereof, etc. In this manner, more and/or different types of content can be used to communicate with callers by causing content to be presented in conjunction with communication over a voice channel.

27 Claims, 10 Drawing Sheets

(56) References Cited

U.S. PATENT DOCUMENTS

| | | | |
|---|---|---|---|
| 8,239,773 B1* | 8/2012 | Billman | 715/751 |
| 8,676,895 B1* | 3/2014 | Roy et al. | 709/205 |
| 8,830,291 B2* | 9/2014 | Kay et al. | 348/14.03 |
| 2003/0018700 A1* | 1/2003 | Giroti et al. | 709/201 |
| 2003/0061286 A1 | 3/2003 | Lin | |
| 2003/0162561 A1* | 8/2003 | Johnson et al. | 455/553 |
| 2004/0166832 A1* | 8/2004 | Portman et al. | 455/412.1 |
| 2005/0163105 A1* | 7/2005 | Naick et al. | 370/352 |
| 2007/0245414 A1 | 10/2007 | Chan et al. | |
| 2008/0052377 A1* | 2/2008 | Light | 709/218 |
| 2009/0154686 A1* | 6/2009 | Purdy et al. | 379/265.09 |
| 2009/0161867 A1 | 6/2009 | Chaudhry | |
| 2010/0131764 A1 | 5/2010 | Goh | |
| 2012/0210243 A1 | 8/2012 | Uhma et al. | |

* cited by examiner

200

| | Identifier | Content | Application(s) | System(s) |
|---|---|---|---|---|
| 250 | (408) 111-1111 | 1) Banking website<br>2) Recorded audio message<br>3) Advertising content | Banking application | Computer System 110 |
| 260 | (408) 222-2222<br>(650) 333-3333 | Personal social networking website | Contact application | Computer System 110<br>Computer System 180 |
| 270 | (510) 444-4444 | 1) Product webpage<br>2) Business social networking website | 1) Business email application<br>2) Calendar application | Computer System 110<br>Computer System 180 |

FIGURE 2

INTERACTION USING CONTENT

RELATED APPLICATIONS

The present application claims the benefit of U.S. Provisional Patent Application No. 61/392,375, filed Oct. 12, 2010, entitled "CALL TO BROWSE," naming Ashutosh Roy as the inventor. That application is incorporated herein by reference in its entirety and for all purposes.

The present application is related to U.S. patent application Ser. No. 13/271,938, filed Oct. 12, 2011, "INTERACTION USING CONTENT," naming Ashutosh Roy, Promod Narang and Sam Hahn as inventors, assigned to the assignee of the present invention. That application is incorporated herein by reference in its entirety and for all purposes.

BACKGROUND OF THE INVENTION

Phone calls continue to be a commonly used and convenient method of contacting a business or person. Although email and chat messaging are gaining popularity, phone calls remain a valuable tool for consumer-to-business (C2B) interaction. Similarly, phone calls remain the dominant form of communication between individuals or consumers.

Businesses often use conventional interactive voice response (IVR) systems to interact with consumers. A phone keypad or voice input to the phone may be used by the caller to interact with a conventional IVR system, where speech recognition software is typically used to read and/or digitize the voice inputs. Conventional IVR systems typically provide an automated response to the inputs such as presenting a recorded message or placing the caller on hold. Additionally, conventional IVR systems may transfer the caller to a human agent at some point during the call to provide further assistance to the caller.

Although conventional IVR systems allow automated interaction with callers, the content available for this interaction is limited. For example, verbal recordings used by conventional IVR systems may be confusing or frustrating to some callers when providing instructions for navigating a webpage or performing some other task. As another example, conventional IVR systems typically utilize verbal recordings in a limited number of languages, and thus, callers who speak other languages may be unable to interact with conventional IVR systems.

SUMMARY OF THE INVENTION

Accordingly, a need exists to allow people and/or businesses to interact using more and/or different types of content. Additionally, a need exists for automated interactions between people and/or businesses using more and/or different types of content. Embodiments of the present invention provide novel solutions to these needs and others as described below.

Embodiments of the present invention are directed to a method, computer-readable medium and system for interacting using content. More specifically, a web response may be executed on a first computer system and/or another computer system associated with the first computer system responsive to the initiation of a call over a voice channel between the first computer system and a second computer system. The web response may include automatically downloading content over a data channel so that it can be automatically presented at the first computer system and/or another computer system associated with the first computer system. The content may include video, audio, information from a social networking website, a blog, other content, some combination thereof, etc. In this manner, more and/or different types of content can be used to communicate with callers by causing content to be presented (e.g., on the first computer system and/or another computer system associated with the first computer system) in conjunction with communication over a voice channel. The voice and data channels may be implemented using a common communication path (e.g., a path capable of communicating voice data and content or other types of data) or separate paths.

In one embodiment, a method of interacting using content includes accessing a request at the first computer system responsive to a phone session between a first computer system and a second computer system over a first channel. The request may be associated with a web response, and wherein the web response includes a download of the content to the first computer system and further includes a display of the content on a display device of the first computer system. The method also includes executing, contemporaneously with the phone session, the web response at the first computer system based on at least one attribute associated with the web response, wherein the executing includes downloading the content from a web server using a second channel, and wherein the executing further includes displaying the content on the display device of the first computer system.

In another embodiment, a computer-readable medium may have computer-readable program code embodied therein for causing a computer system to perform a method of interacting using content as described above. And in yet another embodiment, a system may include a processor and a memory, wherein the memory includes instructions that when executed by the system implement a method of interacting using content as described above.

BRIEF DESCRIPTION OF THE DRAWINGS

The present invention is illustrated by way of example, and not by way of limitation, in the figures of the accompanying drawings and in which like reference numerals refer to similar elements.

FIG. 2 shows an exemplary data structure including at least one attribute in accordance with one embodiment of the present invention.

DETAILED DESCRIPTION OF THE INVENTION

Figure 1:
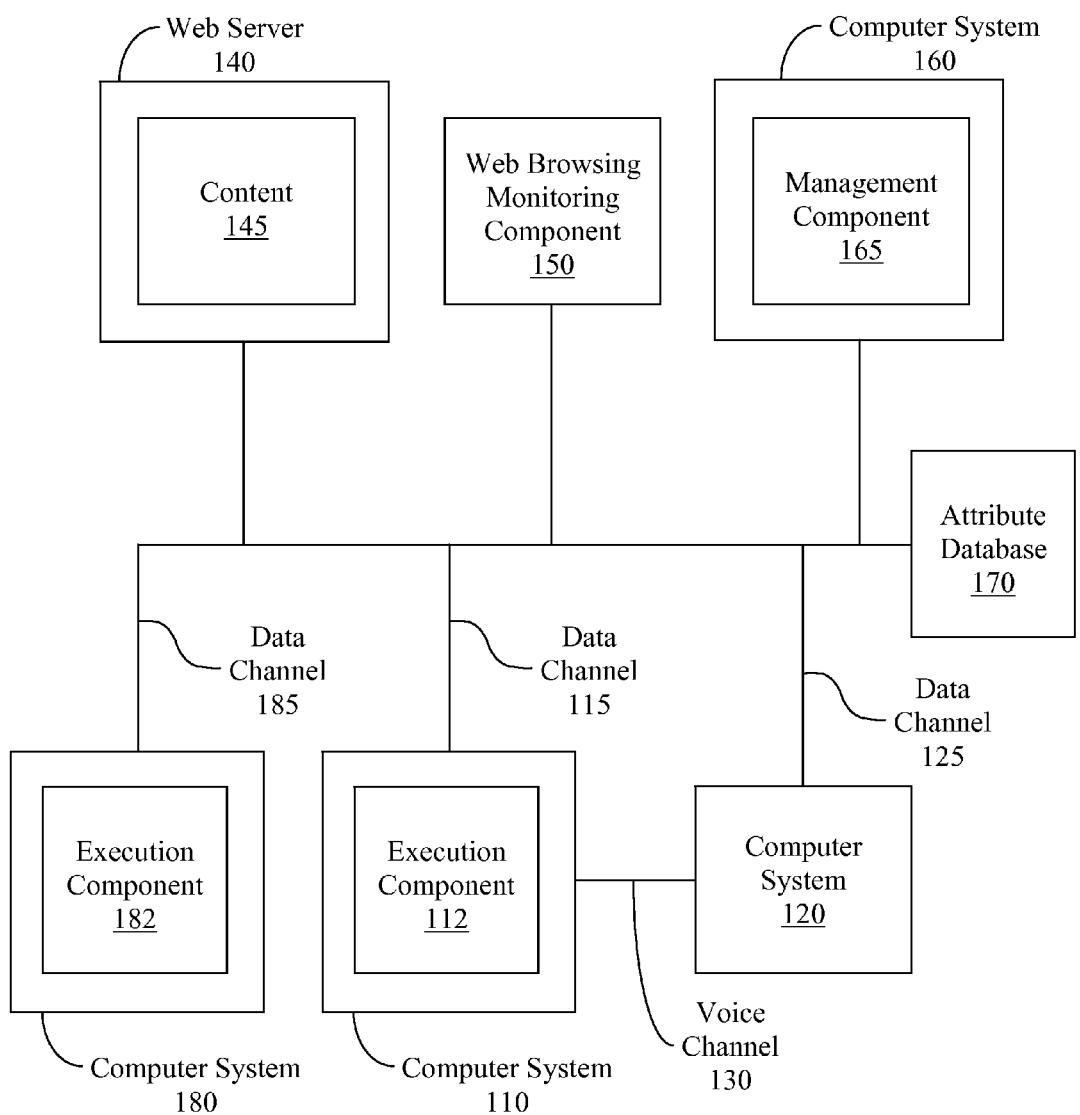
FIG. 1 shows an exemplary system for interacting using content in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "communicating," "creating," "debugging," "defining," "delivering," "depicting," "detecting," "determining," "displaying," "establishing," "executing," "flipping," "generating," "grouping," "hiding," "identifying," "initiating," "interacting," "managing," "manipulating," "modifying," "monitoring," "moving," "outputting," "performing," "placing," "presenting," "processing," "programming," "providing," "querying," "removing," "repeating," "resuming," "sampling," "searching," "showing," "simulating," "sorting," "storing," "subtracting," "suspending," "tracking," "transcoding," "transferring," "transforming," "unblocking," "updating," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary system 100 for interacting using content in accordance with one embodiment of the present invention. As shown in FIG. 1, a web response or web experience may be triggered (e.g., on first computer system 110 and/or computer system 180) responsive to the initiation of a call over a voice channel (e.g., 130) between the first computer system (e.g., 110) and a second computer system (e.g., 120). The web response may include automatically downloading content (e.g., 145) over a data channel (e.g., 115, 185, etc.) from web server 140 so that it can be automatically presented (e.g., displayed using a display device, audibly rendered or played using a speaker, etc.) at the first computer system (e.g., 110) and/or another computer system (e.g., 180). In one embodiment, initiation of a web response may also cause a web browser to be automatically launched to display the downloaded content. The content (e.g., 145) may include an image, video, audio, information from a social networking website (e.g., Facebook, Linkedin, Twitter, etc.), information from a blog, advertising, other content, some combination thereof, etc. In this manner, the amount and/or type of data used to communicate with callers (e.g., a user of first computer system 110 and/or a user of computer system 180) can be increased by causing content to be presented on the first computer system (e.g., 110) and/or another computer system (e.g., 180) in conjunction with communication over a voice channel (e.g., 130).

In one embodiment, one or more of the computer systems (e.g., 110, 120, 180, etc.) may be a mobile phone or other type of computer system capable of communicating over a voice channel (e.g., 130) and a data channel (e.g., 115, 125, 185, etc.). Voice channel 130 may include a cellular network, a public switching telephone network (PSTN), a landline network, at least one device or component capable of communicating speech or spoken sounds between a plurality of systems (e.g., computer system 110, computer system 120, computer system 180, another computer system, etc.), some combination thereof, etc. A data channel (e.g., 115, 125, 185, etc.) may include the Internet, at least one wired link, at least one wireless link, a portion of a cellular network capable of communicating content (e.g., web content, etc.) or other data, at least one device or component capable of communicating data between a plurality of systems (e.g., computer system 110, computer system 120, computer system 180, another computer system, etc.), some combination thereof, etc. In one embodiment, one or more of the computer systems (e.g., 110, 120, 180, etc.) may be implemented in accordance with computer system 600 of FIG. 6.

In one embodiment, at least one data channel (e.g., 115, 125, 185, etc.) and at least one voice channel (e.g., 130) may be implemented using a common communication path (e.g., a path capable of communicating voice signals and content or other types of data). Alternatively, at least one data channel (e.g., 115, 125, 185, etc.) and at least one voice channel (e.g., 130) may be implemented using separate communication paths (e.g., a first path capable of communicating only voice signals and a second path capable of communicating only content or other types of data, a first path capable of communicating only voice signals and a second path capable of communicating voice signals and content or other data, a first path capable of communicating voice signals and content or other data and a second path capable of communicating only content or other types of data, etc.).

As shown in FIG. 1, management component 165 of computer system 160 may allow initiation or control of the web response by a system (e.g., computer system 120, computer system 160, etc.) other than the system (e.g., computer system 110 and/or computer system 180) at which the web response is to be executed. For example, responsive to the communication of a web response request from computer system 120 to computer system 160, component 165 may determine at least one attribute associated with the web response (e.g., what content to download and/or present, when to download and/or present the content, how to download and/or present the content, at least one computer system used to download and/or present the content, etc.) and communicate a request to at least one computer system (e.g., 110, 180, etc.) to cause the web response to be executed at the at least one computer system (e.g., using execution component 112, execution component 182, some combination thereof, etc.) based on the at least one attribute. In one embodiment, the computer systems (e.g., 110, 120, 160, 180, etc.) may be located remotely from one another. As such, the presentation of content (e.g., 145) at one or more computer systems (e.g., 110, 180, etc.) can be initiated and/or controlled using at least one other system (e.g., 120, 160, etc.) responsive to a phone call over a voice channel (e.g., 130) between the first system (e.g., 110) and at least one other system (e.g., 120).

In one embodiment, the amount and/or type of content used to interact with a user may be increased by allowing content to be presented at more than one computer system or by allowing content to be presented at a different computer system (e.g., 180) than is used to conduct the phone call (e.g., computer system 110). For example, a user may continue to conduct the phone call over voice channel 130 (e.g., using computer system 110) while contemporaneously interacting with content presented at computer system 180, thereby allowing the user to interact with content communicated over voice channel 130 and data channel 185.

The web response may be configured based on one or more respective characteristics of the computer systems (e.g., 110, 180, etc.) and/or the content in one embodiment. For example, a web response may be configured so that a computer system (e.g., 110) with a smaller display screen is used to present content received over voice channel 130 (e.g., audio content rendered using a speaker), whereas another computer system (e.g., 180) with a larger display screen is used to present content (e.g., images, video content, etc.) received over a data channel (e.g., 115, 185, etc.). In this example, the first computer system (e.g., 110) may be better suited for use as a phone (e.g., due to lighter weight, better audio reproduction, phone capability, etc.), whereas the other computer systems (e.g., 180) may be better suited to for presentation of images or video content (e.g., due to a faster processor, more memory, better display screen, larger display screen, etc.). The web response may be configured by setting and accessing one or more attributes stored in attribute database 170, where the attributes may be set automatically, by a user, some combination thereof, etc.

In one embodiment, one or more computer systems (e.g., 180) other than the first computer system (e.g., 110) may be automatically determined and/or selected to participate in the web response responsive to a determination that the one or more computer systems (e.g., 180) are in physical proximity to the first computer system (e.g., 110). For example, if a user of computer system 110 places computer system 180 in proximity to computer system 110, a web response may be implemented using one or both computer systems (e.g., 110 and/or 180) responsive to a determination that the computer systems are in proximity to one another. In this manner, a web response may be automatically configured based on a proximity of one or more computer systems (e.g., 110, 180, etc.).

Web browsing monitoring component 150 may monitor web browsing activity performed using the first computer system (e.g., 110) and/or another computer system (e.g., 180). In one embodiment, data associated with the web browsing activity may be monitored or accessed from web server 140 by component 150. The data may be accessed by component 165 and communicated to the second computer system (e.g., 120) in one embodiment, thereby advantageously providing information to the second computer system (e.g., 120) about web browsing activity of at least one computer system (e.g., 110, 180, etc.) that took place during or is otherwise associated with the web response.

The content (e.g., 145) presented at the at least one computer system (e.g., 110, 180, etc.) may be associated with the content or other information (e.g., inquiries, speech, recorded messages, etc.) contemporaneously passed over voice channel 130 (e.g., between computer systems 110 and 120). For example, when implementing an interactive voice response (IVR), computer system 120 may provide automated responses (e.g., presenting at least one recorded message) to and/or accept responses (e.g., keypad input using at least one key or button of computer system 110, a voice input to computer system 110, etc.) from computer system 110 over voice channel 130 (e.g., responsive to a phone call from computer system 110 to the computer system 120, responsive to a phone call from computer system 120 to the computer system 110, etc.). At some point during the phone call or session (e.g., while the user of computer system 110 is on hold waiting for an agent associated with computer system 120, at another time, etc.), a web response may be initiated (e.g., by computer system 120, computer system 160, etc.) and executed at computer system 110 and/or at least one other computer system (e.g., 180). For example, a request (e.g., generated by computer system 120, computer system 160, etc.) may be communicated to at least one computer system (e.g., 110, 180, etc.) from computer system 160 to cause the at least one computer system (e.g., using execution component 112, execution component 182, some combination thereof, etc.) to execute a web response (e.g., involving the downloading of content 145 from web server 140 and the presenting of content 145 on computer system 110, and/or computer system 180). In this manner, more information may be provided to a user of at least one computer system (e.g., in addition to information or content communicated over voice channel 130) by downloading content 145 over a data channel (e.g., 115, 185, etc.) from web server 140.

Data associated with web browsing activity of the at least one computer system (e.g., 110, 180, etc.) may be accessed (e.g., using component 150) and provided to computer system 120 (e.g., over data channel 125). Thus, when the first computer system (e.g., 110) is transferred or connected to an agent (e.g., a human user of computer system 120 or another system coupled therewith), the agent may use the data associated with the web browsing activity to further or better assist the user (e.g., of computer system 110, computer system 180, some combination thereof, etc.). For example, by having information about the content accessed by the at least one computer system (e.g., 110, 180, etc.) as part of the web response, the agent may be able to recommend other content or information to the user to address the questions or needs of the user. As another example, the agent may review the content previously accessed by the at least one computer system (or the user thereof) to point out possible misunderstandings related to the content or to direct the user to other content.

A co-browsing session may be established between computer system 120 and at least one other computer system (e.g., 110, 180, etc.) to allow the user of computer system 120 (e.g., the agent) and the at least one user of the at least one other computer system (e.g., 110, 180, etc.) to co-browse the content (e.g., 145) in one embodiment. The co-browsing session may be implemented in accordance with U.S. patent application Ser. No. 12/210,463, which is incorporated herein by reference in its entirety and for all purposes, in one embodiment. In this manner, the users of the computer systems (e.g., 110, 120, 180, etc.) may contemporaneously browse and/or interact with the same content, thereby allowing additional assistance and/or content to be provided to the caller (e.g., the user of computer system 110 and/or 180).

In one embodiment, the user of the at least one computer system (e.g., 110, 180, etc.) may disconnect or end the phone call before being transferred to an agent (e.g., a user of computer system 120). For example, content 145 provided as part of the web response may provide sufficient information to address the needs or questions of the user. As such, the user may not need to talk with the agent, and therefore, the user may choose to end the phone call or session before reaching the agent.

As shown in FIG. 1, one or more components of system 100 may be owned by or otherwise associated with the same entity, business, enterprise, etc. In one embodiment, computer system 110, component 112, computer system 180, component 182, computer system 120, computer system 160, component 165, web server 140, content 145, web browsing monitoring component 150, or some combination thereof may be owned or otherwise associated with the same entity. And in one embodiment, computer system 120 may be associated with a call center of the entity, business, enterprise, etc.

As an example, where computer system 160 and web server 140 are both associated with a bank, a web response may be initiated and executed on a customer's computer system (e.g., 110, 180, etc.) responsive to a phone call or session between the customer (e.g., a user of computer system 110 and/or 180) and the bank (e.g., a call center or other user of computer system 120) over voice channel 130. In this example, content 145 may include online banking information or other sensitive information. Since the various components of system 100 are owned by or otherwise associated with the same entity, sensitive information may be advantageously communicated between trusted applications or modules running on separate computer systems (e.g., computer system 110, computer system 180, computer system 160, web server 140, some combination thereof, etc.). In one embodiment, the sensitive information may include content 145, data associated with web browsing activity of the web response, etc. Thus, embodiments of the present invention can allow a business to better interact with customers using more and/or different types of content (e.g., communicated over data channel 115, data channel 185, voice channel 130, some combination thereof, etc.).

Authentication may be performed by components of system 100 before transferring sensitive information. In one embodiment, authentication may be performed using at least one token or key provided by management component 165. For example, component 165 may provide the at least one computer system (e.g., 110, 180, etc.) and web server 140 respective keys to enable authentication between the at least one computer system and web server 140 before downloading content 145 to the at least one computer system. In this manner, the security of sensitive information may be increased.

In one embodiment, computer system 160 and/or management component 165 may be owned by or otherwise associated with a third party or separate entity from that associated with another component of system 100 (e.g., computer system 110, component 112, computer system 120, web server 140, content 145, web browsing monitoring component 150, computer system 180, some combination thereof, etc.). For example, computer system 160 and/or management component 165 may be owned by or otherwise associated with a cellular network or provider, whereas at least one other component of system 100 may be owned by or otherwise associated with another entity (e.g., a business, enterprise, etc.). In this case, the web response functionality implemented using embodiments of the present invention may be subscribed to or purchased through the third party (e.g., as an add-on to existing cellular phone service or another type of service), thereby providing advantages for consumers as well as businesses (e.g., by allowing consumers to more conveniently gain access to more and/or different types of content).

Execution component 112 may be an application stored or running on computer system 110 in one embodiment. And in one embodiment, execution component 112 may be a plug-in or module of an application stored or running on computer system 110.

Execution component 182 may be an application stored or running on computer system 180 in one embodiment. And in one embodiment, execution component 182 may be a plug-in or module of an application stored or running on computer system 180.

In one embodiment, a sound or other indication may be presented using the at least one computer system (e.g., 110, 180, etc.) to indicate to the user that the user should begin interacting with content 145 presented using the at least one computer system. For example, where computer system 110 is positioned near the user's ear (e.g., as one would hold a telephone) when communicating with computer system 120 over voice channel 130, the sound or indication may alert the user to change the position of computer system 110 so that a display screen of computer system 110 can be viewed by the user. In one embodiment, the sound or indication may be presented prior to or contemporaneously with the initiation of the web response. In this manner, a user that was previously using computer system 110 as a phone may begin viewing and/or interacting with content 145 using computer system 110 during the web response.

In one embodiment, component 165 may be used to remotely initiate the launching of an application on computer system 110 and/or computer system 180. For example, responsive to determining (e.g., using component 165) at least one application to be launched on computer system 110 and/or computer system 180, a request may be communicated (e.g., from component 165) to at least one computer system (e.g., 110, 180, etc.) to cause the at least one computer system to begin running the at least one application thereon. In one embodiment, launching of the at least one application may be controlled or otherwise implemented by a component (e.g., 112, 182, etc.) running on or otherwise accessible to the at least one computer system in one embodiment. The request may be generated and/or communicated (e.g., from component 165) responsive to the initiation of a phone call over a voice channel (e.g., 130) between the first computer system (e.g., 110) and a second computer system (e.g., 120) in one embodiment. The application may be launched on computer system 110 and/or at least one other computer system (e.g., 180) concurrently with the execution of a phone call (e.g., between computer system 110 and computer system 120) over voice channel 130 in one embodiment.

Accordingly, allowing remote initiation of an application may provide one or more advantages. For example, where a consumer calls a bank or other enterprise, the enterprise (e.g., component 165 associated with the business) may cause an application (e.g., a mobile banking application or agent) to be automatically launched on the computer system (e.g., 110, 180, etc.) to provide easier access for the consumer to information about the consumer's bank account or the like. As another example, remotely launching an application may be used in combination with remotely initiating a web response to provide additional avenues for interacting with users and/or increase the amount of content available for interacting with users.

The application launched on the at least one computer system (e.g., 110, 180, etc.) may be used to access information (e.g., accessed locally from the computer system, downloaded over the Internet, accessed from a remote system or device, etc.) and/or present the information using the at least one computer system. In one embodiment, the application may act as an agent or assistant, provide some other functionality, some combination thereof, etc.

Launching of at least one application on one or more computer systems may be configured based on one or more respective characteristics of the computer systems (e.g., 110, 180, etc.) and/or the at least one application in one embodiment. For example, a more resource-intensive application may be launched on a computer system with larger resources (e.g., processing resources, memory resources, etc.), whereas less resource-intensive applications may be launched on a computer system with smaller resources (e.g., processing resources, memory resources, etc.). The launching of the at least one application may be configured by setting and accessing one or more attributes stored in attribute database 170, where the attributes may be set automatically, by a user, some combination thereof, etc.

In one embodiment, one or more computer systems (e.g., 180) other than the first computer system (e.g., 110) may be automatically determined and/or selected to launch an application responsive to a determination that the one or more computer systems (e.g., 180) are in physical proximity to the first computer system (e.g., 110). For example, if a user of computer system 110 places computer system 180 in proximity to computer system 110, at least one application may be launched using one or both computer systems (e.g., 110 and/or 180) responsive to a determination that the computer systems are in proximity to one another. In this manner, launching of an application may be automatically configured based on a proximity of one or more computer systems (e.g., 110, 180, etc.).

In one embodiment, initiation of a web response and/or launching of an application on one or more computer systems (e.g., 110, 180, etc.) may be performed based on at least on attribute. The at least one attribute may be accessed from mapping or attribute database 170 using a phone number or other identifier of a computer system (e.g., 110, 120, 180, etc.). For example, responsive to initiation of a phone call between the computer systems 110 and 120 over voice channel 130, attribute database 170 may be accessed (e.g., by component 165, by computer system 120, etc.) based on a phone number or identifier of at least one computer system (e.g., 110, 180, etc.) to determine at least one attribute for initiating a web response at the at least one computer system (e.g., 110, 180, etc.) and/or launching at least one application at the at least one computer system (e.g., 110, 180, etc.). In this manner, embodiments of the present invention allow automated responses (e.g., web responses, launching of applications, etc.) involving more and/or different types of content to be customized or personalized for each device or group of devices (e.g., based on an identification of computer system 110, based on an identification of computer system 180, based on a user account, etc.).

At least one attribute associated with a web response may include what content to download and/or present as part of the web response, when to download and/or present the content, how to download and/or present the content, at least one computer system used to download and/or present the content, any or all information required to successfully initiate the web response, some combination thereof, etc. At least one attribute associated with launching of an application may include what application or applications to launch, when to launch the at least one application, at least one computer system used to launch the application or applications, any or all information required to successfully initiate the launching of the application, some combination thereof, etc.

FIG. 2 shows exemplary data structure 200 including at least one attribute in accordance with one embodiment of the present invention. In one embodiment, data structure 200 may map or otherwise provide a relationship between a computer system (e.g., identified by a phone number or other identifier) and at least one attribute (e.g., associated with content to be presented, associated with at least one application to be launched, some combination thereof, etc.). And in one embodiment, data structure 200 may be stored in attribute database 170.

As shown in FIG. 2, column 210 may include identifiers (e.g., phone numbers, media access control (MAC) addresses, etc.) associated with computer systems. Column 220 may include content associated with one or more of the computer systems identified in column 210. Column 230 may include at least one application associated with one or more of the computer systems identified in column 210. Column 240 may include at least one computer system used to present content listed in column 220 (e.g., as part of a web response performed responsive to identifying a computer system in column 210) and/or used to launch an application listed in column 230 (e.g., responsive to identifying a computer system in column 210). In this manner, one or more attributes (e.g., content, at least one application, at least one computer system, etc.) may be returned responsive to an indexing of data structure 200 using an identifier of a computer system (e.g., listed in column 210), where the information returned may be used to implement a web response, launch an application, otherwise initiate a web-based user experience, some combination thereof, etc.

Taking row 250 of data structure 200 as an example, where a phone call over voice channel 130 involves a computer system (e.g., 110) associated with phone number "(408) 111-1111," a web response may be implemented on at least one computer system (e.g., listed in column 240) based on at least one attribute in column 220. The web response may involve the display (e.g., using a web browser of the at least one computer system) of a banking website, rendering of a recorded audio message, and presentation of advertising content (e.g., an image, video, audio, webpage, etc.). A banking application may be launched on the at least one computer system (e.g., sequentially and/or contemporaneously with the initiation of the web response) based on the attributes in column 230. In this manner, a user of the computer system (e.g., 110, 180, etc.) may easily and conveniently access banking information or other content on the computer system by calling or receiving a phone call from the bank. Additionally, the web response and/or launching of the application may allow the bank to interact with the user using more and/or different types of content.

As another example, where a phone call over voice channel 130 involves a computer system (e.g., 110) associated with phone number "(408) 222-2222" and/or phone number "(650) 333-3333" (e.g., as shown in row 260), a web response may be implemented on at least one computer system (e.g., listed in column 240) based on at least one attribute in column 220. The web response may involve the display (e.g., using a web browser of the at least one computer system) of a personal social networking website (e.g., Facebook, Twitter, etc.). A contacts application may be launched on the at least one computer system (e.g., sequentially and/or contemporaneously with the initiation of the web response) based on the attributes in column 230. In this manner, a user of the at least one computer system (e.g., 110, 180, etc.) may easily and conveniently access personal information (e.g., about the user of computer system 120 from a social networking website and/or from a contacts application launched on the computer system 110) by calling or receiving a phone call from another computer system (e.g., 120).

Row 260 of data structure 200 is one example of at least one attribute associated with a group or plurality of computer systems. As such, in one embodiment, a similar web response and/or launching of at least one application may occur on the plurality of devices responsive to a phone call including one or more of the plurality of devices.

Taking row 270 of data structure 200 as yet another example, where a phone call over voice channel 130 involves a computer system (e.g., 110) associated with phone number "(510) 444-4444," a web response may be implemented on at least one computer system (e.g., listed in column 240) based on at least one attribute in column 220. The web response may involve the display (e.g., using a web browser of the at least one computer system) of a product webpage and a business social networking website (e.g., Linkedin, etc.). A business email application and a calendar application may be launched on the at least one computer system (e.g., sequentially and/or contemporaneously with the initiation of the web response) based on the attributes in column 230. In this manner, a user of the at least one computer system (e.g., 110, 180, etc.) may easily and conveniently access business-related information (e.g., about a product, about a business associate or client that may be calling or being called, from an email displayed using a business email application, from an entry in a calendar application, etc.) by calling or receiving a phone call from another computer system (e.g., 120).

Although FIG. 2 depicts data structure 200 with a certain number of elements (e.g., rows, columns, types of data, etc.), it should be appreciated that data structure 200 may include a different number of elements in other embodiments. Additionally, although FIG. 2 depicts data structure 200 with a certain arrangement of elements (e.g., rows, columns, types of data, etc.), it should be appreciated that data structure 200 may include a different arrangement of elements in other embodiments.

Although FIG. 1 shows system 100 with a certain number of components, it should be appreciated that system 100 may have a different number of components in other embodiments. For example, a plurality of components may be combined, a component may be split into multiple sub-components, etc. Additionally, although FIG. 1 shows system 100 with a certain arrangement of components, it should be appreciated that system 100 may have a different arrangement of components in other embodiments.

Figure 3A:
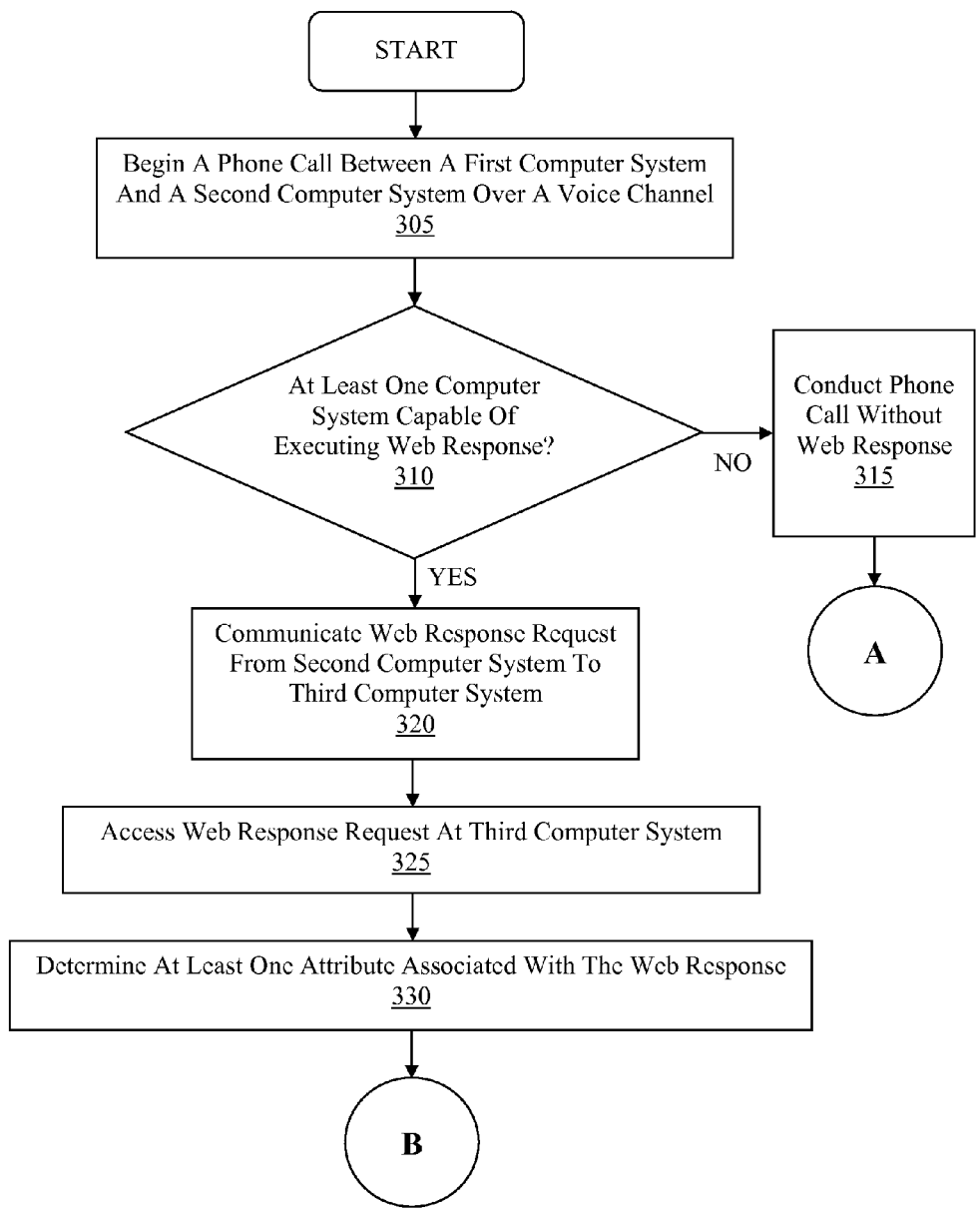
FIG. 3A shows a first portion of a flowchart of an exemplary computer-implemented process for interacting using content in accordance with one embodiment of the present invention.
Figure 3B:
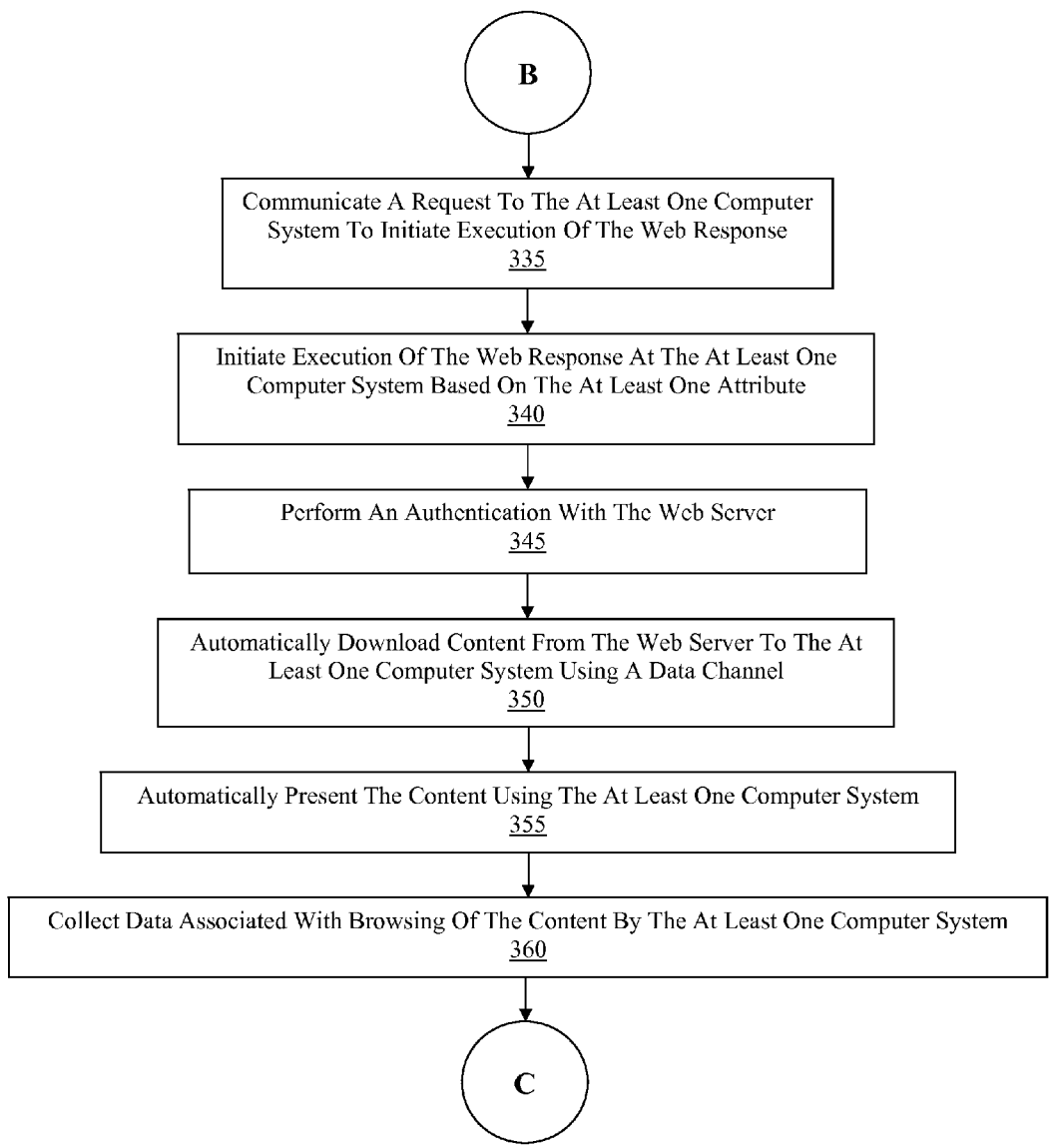
FIG. 3B shows a second portion of a flowchart of an exemplary computer-implemented process for interacting using content in accordance with one embodiment of the present invention.
Figure 3C:
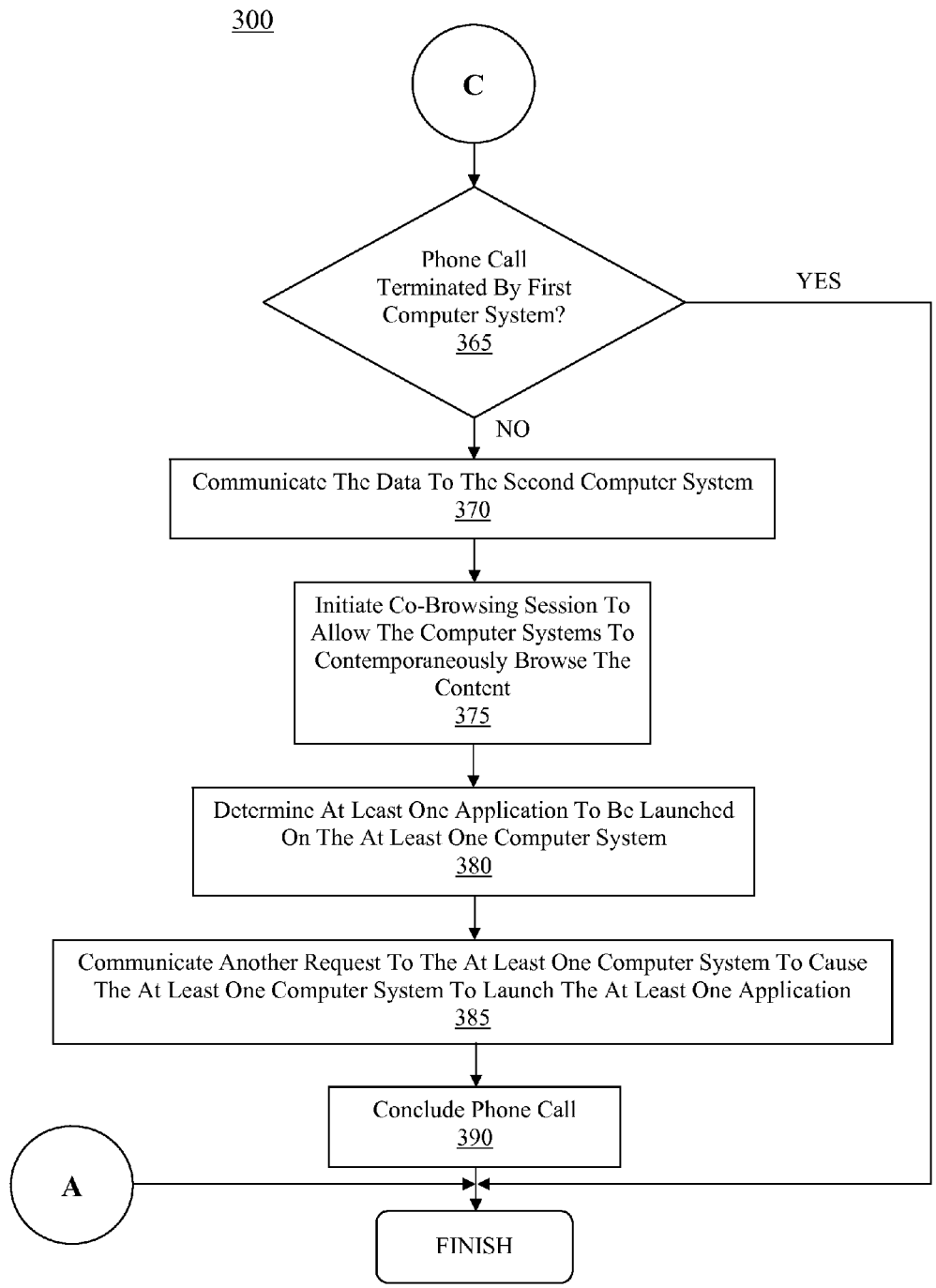
FIG. 3C shows a third portion of a flowchart of an exemplary computer-implemented process for interacting using content in accordance with one embodiment of the present invention.

FIGS. 3A, 3B and 3C shows a flowchart of exemplary computer-implemented process 300 for interacting using content in accordance with one embodiment of the present invention. As shown in FIG. 3A, step 305 involves beginning a phone call or session between a first computer system (e.g., 110) and a second computer system (e.g., 120) over a voice channel (e.g., 130). The phone call or session may be initiated by the first computer system (e.g., 110), the second computer system (e.g., 120), or another component (e.g., management component 165, an automatic dialer, etc.).

Step 310 involves determining whether at least one computer system (e.g., 110, 180, etc.) is capable of executing a web response. In one embodiment, at least one computer system may be determined to be capable of executing a web response if it includes or can otherwise utilize a component capable of allowing execution of a web response (e.g., execution component 112, execution component 182, etc.), where the component may be an application, a plug-in or module of an application, etc. If it is determined in step 310 that the at least one computer system is unable to execute a web response, then the phone call may be conducted in step 315 without performing a web response and then process 300 may terminate. Alternatively, if it is determined in step 310 that the at least one computer system is capable of executing a web response, then step 320 may be performed.

As shown in FIG. 3A, step 320 involves communicating a web response request from the second computer system (e.g., 120) to a third computer system (e.g., 160). The web response request may be accessed at the third computer system in step 325. In one embodiment, the request associated with the web response may be accessed by management component 165 (e.g., stored or running on computer system 160) in step 325.

Step 330 involves determining at least one attribute associated with the web response (e.g., associated with the web response request communicated in step 320 and/or accessed in step 325). In one embodiment, the at least one attribute may be determined by indexing a mapping or attribute database (e.g., 170) using an identifier of at least one computer system (e.g., 110, 180, etc.). And in one embodiment, the at least one attribute may be associated with or used to initiate a web response to be executed at the at least one computer system (e.g., what content to download and/or present, when to download and/or present the content, how to download and/or present the content, at least one computer system used to download and/or present the content, etc.), where the web response may be used to create a web experience. And in one embodiment, step 330 may be performed by a management component (e.g., 165 of computer system 160).

As shown in FIG. 3B, step 335 involves communicating a request to the at least one computer system (e.g., 110, 180, etc.) to initiate execution of the web response. In one embodiment, step 335 may be performed by a management component (e.g., 165 of computer system 160).

Step 340 involves initiating execution of the web response at the at least one computer system (e.g., 110, 180, etc.) based on the at least one attribute (e.g., determined in step 330). The web response may include one or more operations of steps 345, 350, 355, or some combination thereof. In one embodiment, step 340 may be controlled or implemented by an execution component (e.g., 112 of computer system 110, 182 of computer system 180, etc.). And in one embodiment, the web response may be executed contemporaneously with the phone session (e.g., initiated in step 305).

As shown in FIG. 3B, step 345 involves performing an authentication with the web server (e.g., 140). The authentication performed in step 345 may be between the first computer system (e.g., 110) and the web server, between at least one other computer system (e.g., 180) and the web server, etc. The authentication may be performed using at least one token provided by a management component (e.g., 165 of computer system 160) to the at least one computer system (e.g., 110, 180, etc.) in one embodiment. And in one embodiment, the authentication may be performed using at least one token provided by a management component (e.g., 165 of computer system 160) to web server 140.

In one embodiment, authentication between the at least one computer system (e.g., 110, 180, etc.) and the web server (e.g., 140) may increase security of the data transferred between the at least one computer system and the web server. And in one embodiment, authentication between the at least one computer system (e.g., 110, 180, etc.) and the web server (e.g., 140) may reduce unauthorized access to content (e.g., 145) downloaded from the web server (e.g., 140).

Step 350 involves automatically downloading content from the web server (e.g., 140) to the at least one computer system (e.g., 110, 180, etc.) using a data channel (e.g., 115, 185, etc.). The content may be downloaded in step 350 in accordance with the at least one attribute (e.g., associated with what content to download, when to download the content, how to download the content, what computer system or systems used to download the content, etc.). And in one embodiment, the data channel (e.g., 115, 185, etc.) used to download the content in step 350 may be established or activated contemporaneously with a voice channel (e.g., 130) used to conduct the phone call or session in step 305. In this manner, the at least one computer system (e.g., 110, 180, etc.) may contemporaneously communicate over a plurality of communication channels (e.g., data channel 115, data channel 185, voice channel 130, etc.) with at least one other system (e.g., computer system 120, web server 140, computer system 160, etc.), where the plurality of communication channels include at least two types of communication channels (e.g., a data channel, a voice channel, etc.).

As shown in FIG. 3B, step 355 involves automatically presenting the content (e.g., downloaded in step 350) using the at least one computer system (e.g., 110, 180, etc.). Presentation of the content in step 355 may include displaying the content using a display device of the at least one computer system, audibly rendering or playing using a speaker of the at least one computer system, some combination thereof, etc. The content may be displayed using a web browser of the at least one computer system (e.g., 110, 180, etc.) in one embodiment. The content may be presented in step 355 in accordance with the at least one attribute (e.g., associated with what content to present, when to present the content, how to present the content, what computer system or systems used to present the content, etc.). In this manner, more and/or different types of content may be used to interact with a user of the at least one computer system (e.g., in addition to content communicated over voice channel 130 and/or in addition to launching of at least one application on the at least one computer system as discussed with respect to steps 380 and 385).

In one embodiment, the web response may be executed contemporaneously with the phone session (e.g., initiated in step 305) to provide a valuable synergy that allows more and/or different information or content to be presented to a user (e.g., over data channel 115, data channel 185, voice channel 130, some combination thereof, etc.). The content of the web response may be related to the nature of the phone call or session in one embodiment. In this manner, the voice channel (e.g., 130) and at least one data channel (e.g., 115, 125, 185, etc.) may be interrelated to solve a common problem, address a common inquiry, etc. Furthermore, an application may be launched on the at least one computer system (e.g., 110, 185, etc.) used to implement the web response, thereby further increasing the amount and/or variety of content used to interact with the user of the computer system. In one embodiment, the application and/or a launching thereof may also be related to the nature of the phone call over the voice channel (e.g., 130) and/or related to the content of the web response.

Step 360 involves collecting data associated with browsing of the content (e.g., 145) by the at least one computer system (e.g., 110, 185, etc.). In one embodiment, step 360 may involve collecting information about what content (e.g., images, video, websites, webpages, etc.) was viewed, when the content was viewed, an order the content was viewed, etc. Step 360 may involve collecting information about the web browsing while the at least one computer system is on hold (e.g., waiting for an agent or other user), while the at least one computer system is involved in an IVR with the second computer system (e.g., 120), before the at least one computer system is transferred to or connected with an agent associated with the second computer system, etc. In one embodiment, step 360 may be performed by a web browsing monitoring component (e.g., 150).

As shown in FIG. 3C, step 365 involves determining whether the phone call has been terminated by the first computer system (e.g., 110). If it is determined in step 370 that the phone call has been terminated, then process 300 may terminate. Alternatively, if it is determined in step 370 that the phone call has not been terminated, then process 300 may proceed to step 375.

Step 370 involves communicating the data (e.g., collected in step 360) to the second computer system (e.g., 120). In one embodiment, the data may be communicated in step 370 to the second computer system (e.g., 120) through the third computer system (e.g., 160).

Accordingly, the data may be used (e.g., by an agent or other user of the second computer system) to provide further assistance or content to a user of the at least one computer system (e.g., 110, 180, etc.) in one embodiment. For example, when the at least one computer system (e.g., 110, 180, etc.) is transferred or connected to an agent (e.g., a human user of the second computer system or another system coupled therewith), the agent may use the data associated with the web browsing activity to further or better assist the user of the at least one computer system (e.g., 110, 180, etc.). In this manner, by having information about the content accessed by the at least one computer system (e.g., 110, 180, etc.) as part of the web response, the agent may be able to recommend other content or information to the user to address the questions or needs of the user. Additionally, the agent may review the content previously accessed by the at least one computer system (or the user thereof) to point out possible misunderstandings related to the content or to direct the user to other content.

Step 375 involves initiating a co-browsing session (e.g., between computer system 110, computer system 120, computer system 180, some combination thereof, etc.) to allow the computer systems (e.g., 110, 120, 180, some combination thereof, etc.) to contemporaneously browse the content (e.g., 145). The co-browsing session may be implemented in step 375 in accordance with U.S. patent application Ser. No.

12/210,463, which is incorporated herein by reference in its entirety and for all purposes, in one embodiment. In this manner, the users of the computer systems (e.g., 110, 120, 180, some combination thereof, etc.) may contemporaneously browse and/or interact with the same content, thereby allowing additional assistance and/or content to be provided to a caller (e.g., the user of computer system 110, computer system 180, etc.).

As shown in FIG. 3C, step 380 involves determining at least one application to be launched on the at least one computer system. In one embodiment, the at least one application may be determined based on at least one attribute (e.g., within attribute database 170). For example, the at least one application to be launched may be determined in step 380 by indexing an attribute database (e.g., 170) using an identifier of the at least one computer system (e.g., 110, 180, etc.). In one embodiment, step 380 may be performed by a management component (e.g., 165 of computer system 160).

Step 385 involves communicating another request to the at least one computer system (e.g., 110, 180, etc.) to cause the at least one computer system to launch the at least one application. For example, an execution component (e.g., 112, 182, etc.) of the at least one computer system may automatically initiate execution of at least one application (e.g., determined in step 380) on the at least one computer system responsive to the request. In this manner, more and/or different types of content may be used to interact with a user of the at least one computer system (e.g., in addition to content communicated over voice channel 130 and/or in addition to content presented as part of a web response on the at least one computer system).

As shown in FIG. 3C, step 390 involves concluding the phone call. Conclusion of the phone call in step 390 may be initiated by the first computer system (e.g., 110), the second computer system (e.g., 120), another component of system 100, some combination thereof, etc.

Figure 4:
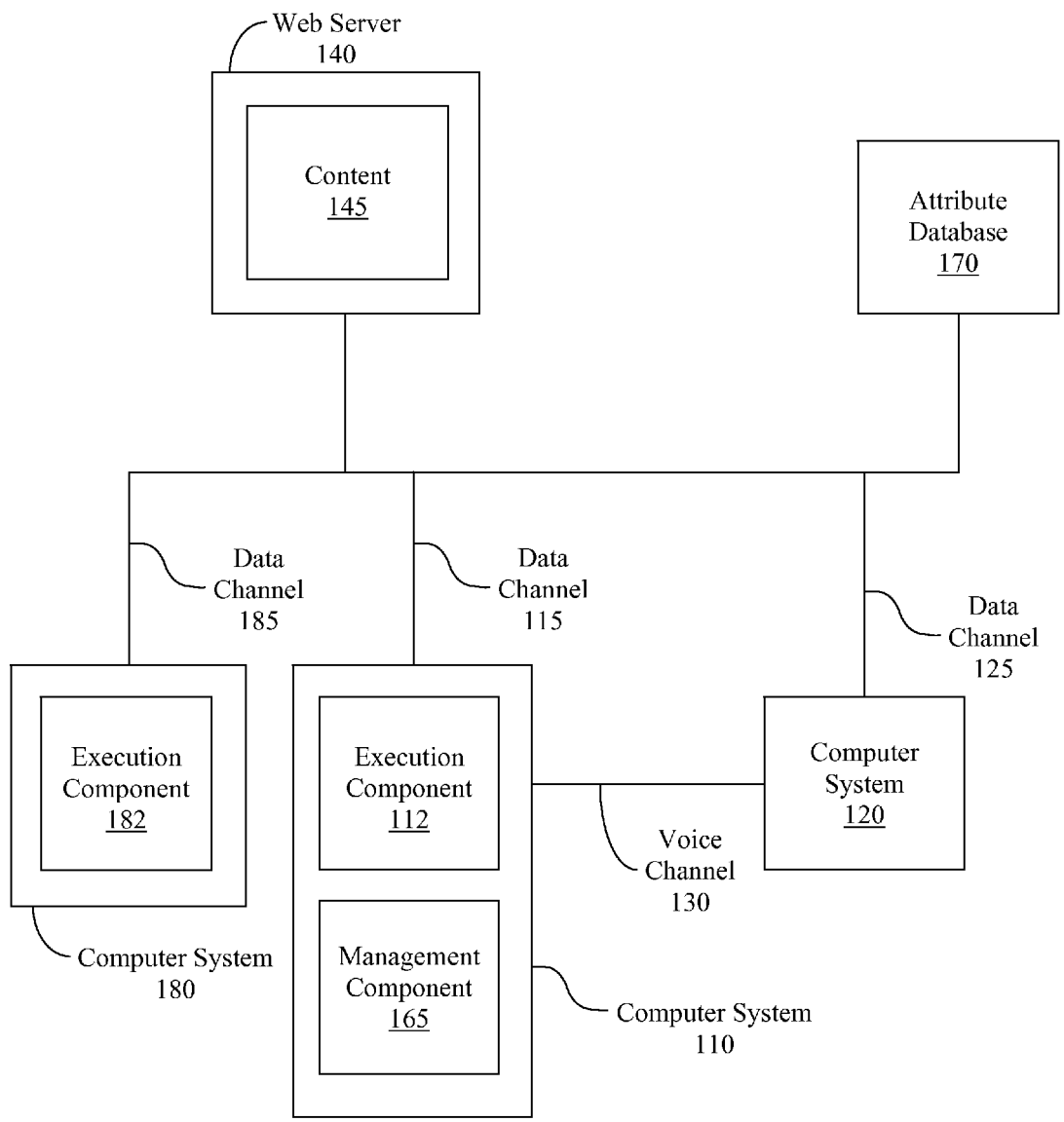
FIG. 4 shows an exemplary system with a management component located at or running on a computer system in accordance with one embodiment of the present invention.

FIG. 4 shows exemplary system 400 with management component 165 located at or running on computer system 110 in accordance with one embodiment of the present invention. System 400 may operate similarly to system 100 except that requests for web responses or launching of applications on at least one computer system (e.g., 110, 180, etc.) may be managed by management component 165 located at or running on computer system 110. For example, requests initiated at or originating from computer system 120 may be communicated (e.g., over data channel 125, data channel 115, the Internet, etc.) directly to management component 165 at computer system 110 for initiating a web response and/or launching at least one application at one or more computer systems (e.g., using execution component 112, using execution component 182, etc.). As another example, where a response is initiated by or originates at management component 165, the response may be communicated internally (e.g., within computer system 110 over one or more internal paths or buses) from management component 165 to execution component 112 to initiate the web response and/or launch at least one application on at least one computer system (e.g., 110, 180, etc.). In this manner, the amount and/or type of data used to communicate with callers (e.g., a user of first computer system 110) can be increased using a management component (e.g., 165) located at or running on a computer system (e.g., 110) participating in a phone call with at least one other computer system (e.g., 120).

In one embodiment, content may be presented and/or at least one application may be launched at a computer system receiving a phone call. For example, where a phone call between computer systems 110 and 120 (e.g., over voice channel 130) is initiated by computer system 120 (e.g., a user of computer system 120 calls a user of computer system 110), content may be presented and/or at least one application may be launched at computer system 110 (e.g., using management component 165 and/or execution component 112). As such, in one embodiment, a user of computer system 110 may provided information about a user of computer system 120 (e.g., via a social networking page of the user of computer system 120, via contact application or calendar application with an entry associated with the user of computer system 120, etc.) and/or provided other information where computer system 120 is used to initiate or place the phone call.

Content may be presented and/or at least one application may be launched at a computer system initiating or placing a phone call in one embodiment. For example, where a phone call between computer systems 110 and 120 (e.g., over voice channel 130) is initiated by computer system 110 (e.g., a user of computer system 110 calls a user of computer system 120), content (e.g., accessed over data channel 115 and/or data channel 125) may be presented and/or at least one application may be launched at computer system 110 (e.g., using management component 165 and/or execution component 112). As such, in one embodiment, a user of computer system 110 may be provided information about a user of computer system 120 (e.g., via a social networking page of the user of computer system 120, via contact application or calendar application with an entry associated with the user of computer system 120, etc.) and/or provided other information where computer system 110 is used to initiate or place the phone call.

As shown in FIG. 4, management component 165 may be an application stored or running on computer system 110 in one embodiment. In one embodiment, management component 165 may be a plug-in or module of an application stored or running on computer system 110. And in one embodiment, management component 165 may be part of the same application, plug-in, module, etc. as execution component 112 stored or running on computer system 110.

Although FIG. 4 shows system 400 with a certain number of components, it should be appreciated that system 400 may have a different number of components in other embodiments. For example, a plurality of components may be combined, a component may be split into multiple sub-components, etc. Additionally, although FIG. 4 shows system 400 with a certain arrangement of components, it should be appreciated that system 400 may have a different arrangement of components in other embodiments.

Figure 5A:
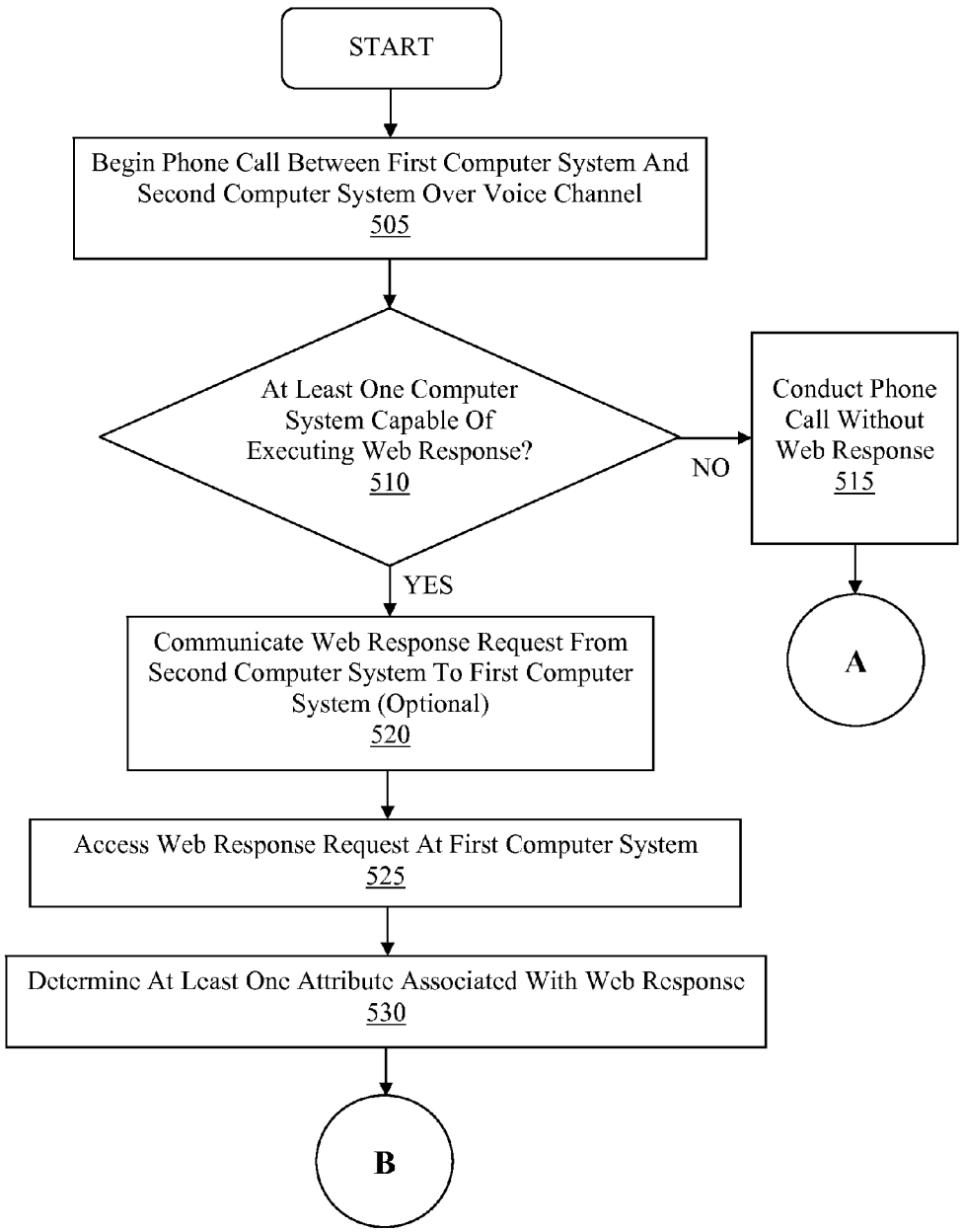
FIG. 5A shows a first portion of a flowchart of an exemplary computer-implemented process for interacting using a management component located at or running on a computer system in accordance with one embodiment of the present invention.
Figure 5B:
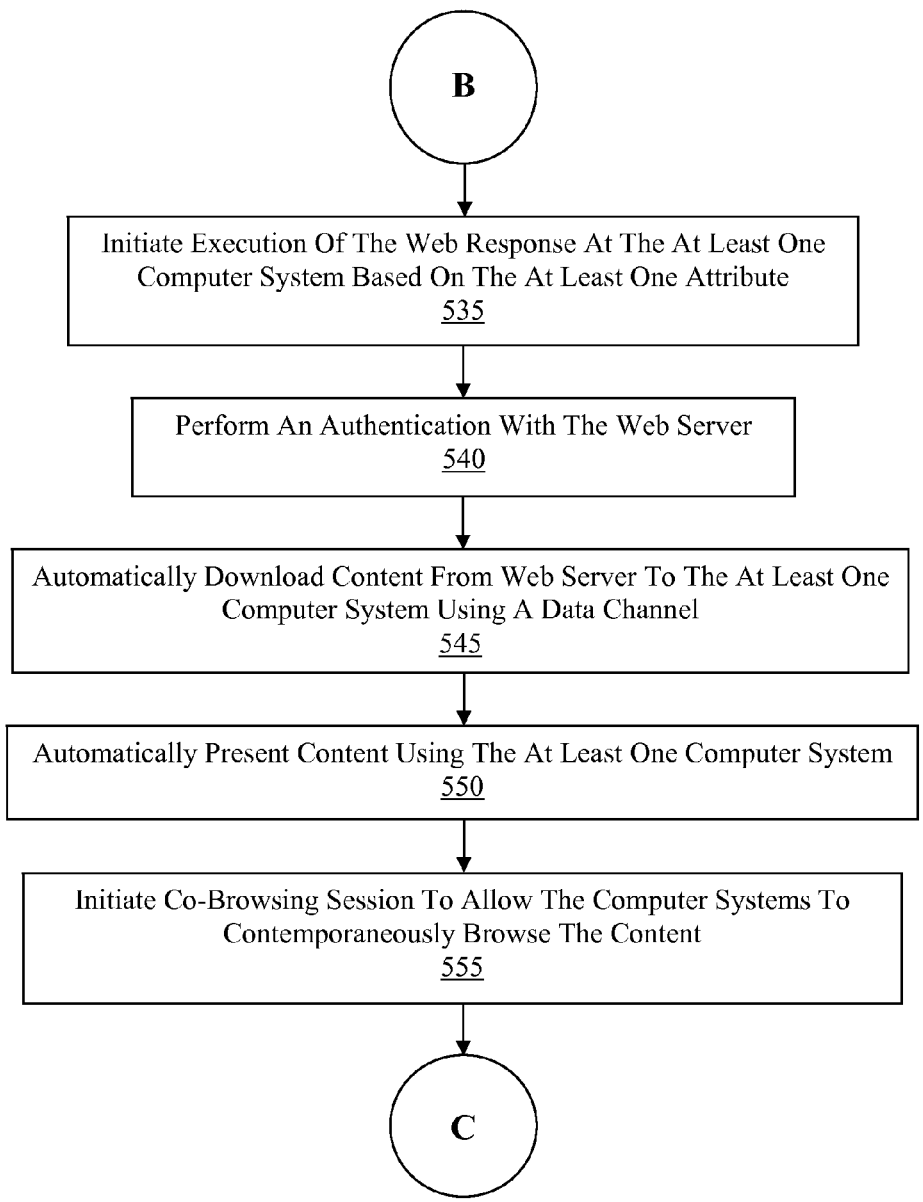
FIG. 5B shows a second portion of a flowchart of an exemplary computer-implemented process for interacting using a management component located at or running on a computer system in accordance with one embodiment of the present invention.
Figure 5C:
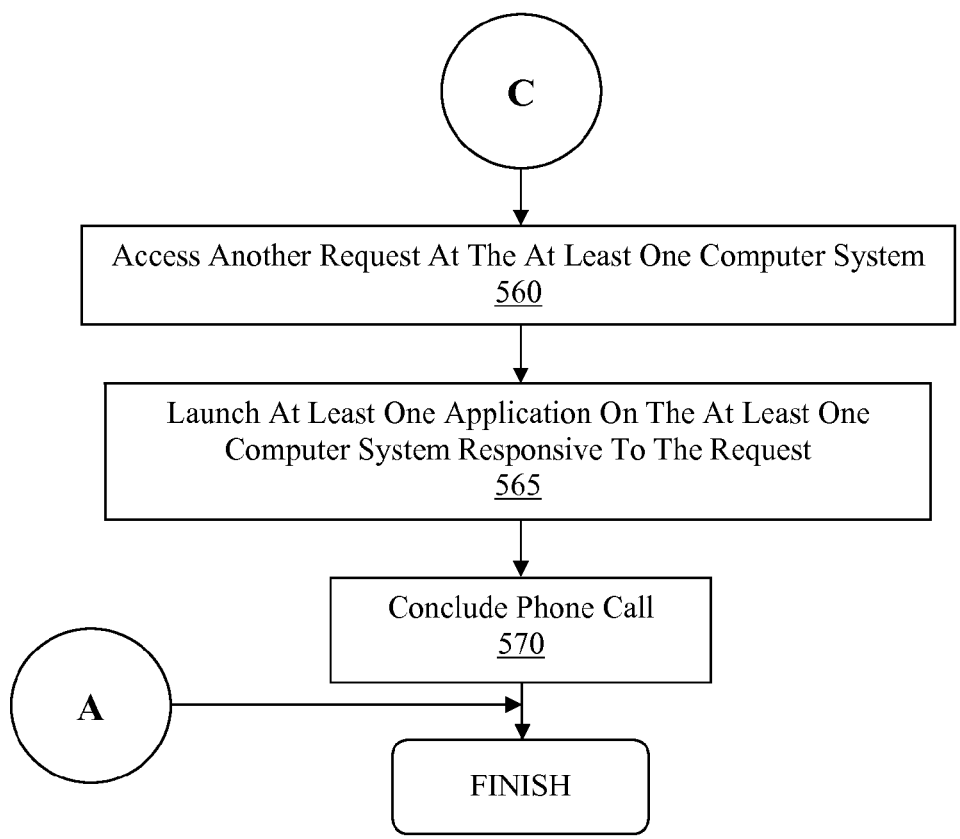
FIG. 5C shows a third portion of a flowchart of an exemplary computer-implemented process for interacting using a management component located at or running on a computer system in accordance with one embodiment of the present invention.

FIGS. 5A, 5B and 5C shows a flowchart of exemplary computer-implemented process 500 for interacting using a management component 165 located at or running on computer system 110 in accordance with one embodiment of the present invention. As shown in FIG. 5A, step 505 involves beginning a phone call or session between a first computer system (e.g., 110) and a second computer system (e.g., 120) over a voice channel (e.g., 130). The phone call or session may be initiated by the first computer system (e.g., 110), the second computer system (e.g., 120), or another component (e.g., management component 165, an automatic dialer, etc.).

Step 510 involves determining whether at least one computer system (e.g., 110, 180, etc.) is capable of executing a web response. In one embodiment, at least one computer system may be determined to be capable of executing a web response if it includes or can otherwise utilize a component capable of allowing execution of a web response (e.g., execution component 112, execution component 182, etc.), where the component may be an application, a plug-in or module of an application, etc. If it is determined in step 510 that the at least one computer system is unable to execute a web response, then the phone call may be conducted in step 515 without performing a web response and then process 500 may terminate. Alternatively, if it is determined in step 510 that the at least one computer system is capable of executing a web response, then step 520 may be performed.

As shown in FIG. 5A, step 520 involves communicating a web response request from the second computer system (e.g., 120) to the first computer system (e.g., 110). In one embodiment, step 520 may be omitted where the web response request is generated by or otherwise originates at computer system 110. For example, where a request associated with a web response is initiated by or originates at management component 165 as shown in FIG. 4, step 520 may be omitted.

The web response request may be accessed at the first computer system in step 525. In one embodiment, the request associated with the web response may be accessed by management component 165 (e.g., stored or running on computer system 110) in step 525.

As shown in FIG. 5A, step 530 involves determining at least one attribute associated with the web response (e.g., associated with the web response request communicated in step 520 and/or accessed in step 525). In one embodiment, the at least one attribute may be determined by indexing a mapping or attribute database (e.g., 170) using an identifier of the at least one computer system (e.g., 110, 180, etc.). And in one embodiment, the at least one attribute may be associated with a web response to be executed at the at least one computer system (e.g., what content to download and/or present, when to download and/or present the content, how to download and/or present the content, at least one computer system used to download and/or present the content, etc.), where the web response may be used to create a web experience. And in one embodiment, step 530 may be performed by a management component (e.g., 165 of computer system 110).

As shown in FIG. 5B, step 535 involves initiating execution of the web response at the at least one computer system (e.g., 110, 180, etc.) based on the at least one attribute (e.g., determined in step 530). The web response may include one or more operations of steps 540, 545, 550, or some combination thereof. In one embodiment, step 535 may be controlled or implemented by an execution component (e.g., 112 of computer system 110, 182 of computer system 180, etc.). And in one embodiment, the web response may be executed contemporaneously with the phone session (e.g., initiated in step 505).

Step 540 involves performing an authentication with the web server (e.g., 140). The authentication performed in step 540 may be between the first computer system (e.g., 110) and the web server, between at least one other computer system (e.g., 180) and the web server, etc. The authentication may be performed using at least one token provided by a management component (e.g., 165) in one embodiment. And in one embodiment, the authentication may be performed using at least one token provided by a management component (e.g., 165) to web server 140.

In one embodiment, authentication between the at least one computer system (e.g., 110, 180, etc.) and the web server (e.g., 140) may increase security of the data transferred between the at least one computer system and the web server. And in one embodiment, authentication between the at least one computer system (e.g., 110, 180, etc.) and the web server (e.g., 140) may reduce unauthorized access to content (e.g., 145) downloaded from the web server (e.g., 140).

Step 545 involves automatically downloading content from the web server (e.g., 140) to the at least one computer system (e.g., 110, 180, etc.) using a data channel (e.g., 115). The content may be downloaded in step 545 in accordance with the at least one attribute (e.g., associated with what content to download, when to download the content, how to download the content, what computer system or systems used to download the content, etc.). And in one embodiment, the data channel (e.g., 115) used to download the content in step 545 may be established or activated contemporaneously with a voice channel (e.g., 130) used to conduct the phone call or session in step 505. In this manner, the at least one computer system (e.g., 110, 180, etc.) may contemporaneously communicate over a plurality of communication channels (e.g., data channel 115, voice channel 130, etc.) with at least one other system (e.g., computer system 120, web server 140, etc.), where the plurality of communication channels include at least two types of communication channels (e.g., a data channel, a voice channel, etc.).

As shown in FIG. 5B, step 550 involves automatically presenting the content (e.g., downloaded in step 545) using the at least one computer system (e.g., 110, 180, etc.). Presentation of the content in step 550 may include displaying the content using a display device of the at least one computer system, audibly rendering or playing using a speaker of the at least one computer system, some combination thereof, etc. The content may be displayed using a web browser of the at least one computer system (e.g., 110, 180, etc.) in one embodiment. The content may be presented in step 550 in accordance with the at least one attribute (e.g., associated with what content to present, when to present the content, how to present the content, what computer system or systems used to present the content, etc.). In this manner, more and/or different types of content may be used to interact with a user of the at least one computer system (e.g., in addition to content communicated over voice channel 130 and/or in addition to launching of at least one application on the at least one computer system as discussed with respect to steps 560 and 565).

Step 555 involves initiating a co-browsing session (e.g., between computer system 110, computer system 120, computer system 180, some combination thereof, etc.) to allow the computer systems (e.g., 110, 120, 180, some combination thereof, etc.) to contemporaneously browse the content (e.g., 145). The co-browsing session may be implemented in step 555 in accordance with U.S. patent application Ser. No. 12/210,463, which is incorporated herein by reference in its entirety and for all purposes, in one embodiment. In this manner, the users of the computer systems (e.g., 110, 120, 180, some combination thereof, etc.) may contemporaneously browse and/or interact with the same content, thereby allowing additional assistance and/or content to be provided to a caller (e.g., the user of computer system 110, computer system 180, etc.).

As shown in FIG. 5C, step 560 involves accessing another request at the at least one computer system (e.g., at execution component 112, at execution component 182, etc.). The request accessed in step 560 may be a request to launch at least one application on the at least one computer system (e.g., 110, 180, etc.). The request may be initiated by or originate at computer system 120 (e.g., before communication to computer system 110) in one embodiment. Alternatively, the request may be initiated by or originate at computer system 110 and/or computer system 180 in one embodiment.

In one embodiment, the request accessed in step 560 may be associated with at least one attribute (e.g., within attribute database 170). For example, the at least one application to be launched may be determined (e.g., by management component 165) by indexing an attribute database (e.g., 170) using an identifier of the at least one computer system (e.g., 110, 180, etc.). The at least one application to be launched may then be encoded in or otherwise associated with the request (e.g., using management component 165) such that a component of the at least one computer system 110 (e.g., execution component 112, execution component 182, etc.) can determine or identify the at least one application to be launched on the at least one computer system.

As shown in FIG. 5C, step 565 involves launching at least one application on the at least one computer system (e.g., 110, 180, etc.) responsive to the request (e.g., accessed in step 560). For example, an execution component (e.g., 112, 182, etc.) of the at least one computer system may automatically initiate execution of at least one application on the at least one computer system responsive to the request. In this manner, more and/or different types of content may be used to interact with a user of the at least one computer system (e.g., in addition to content communicated over voice channel 130 and/or in addition to content presented as part of a web response on the at least one computer system).

Step 570 involves concluding the phone call. Conclusion of the phone call in step 570 may be initiated by the first computer system (e.g., 110), the second computer system (e.g., 120), another component of system 400, some combination thereof, etc.

Figure 6:
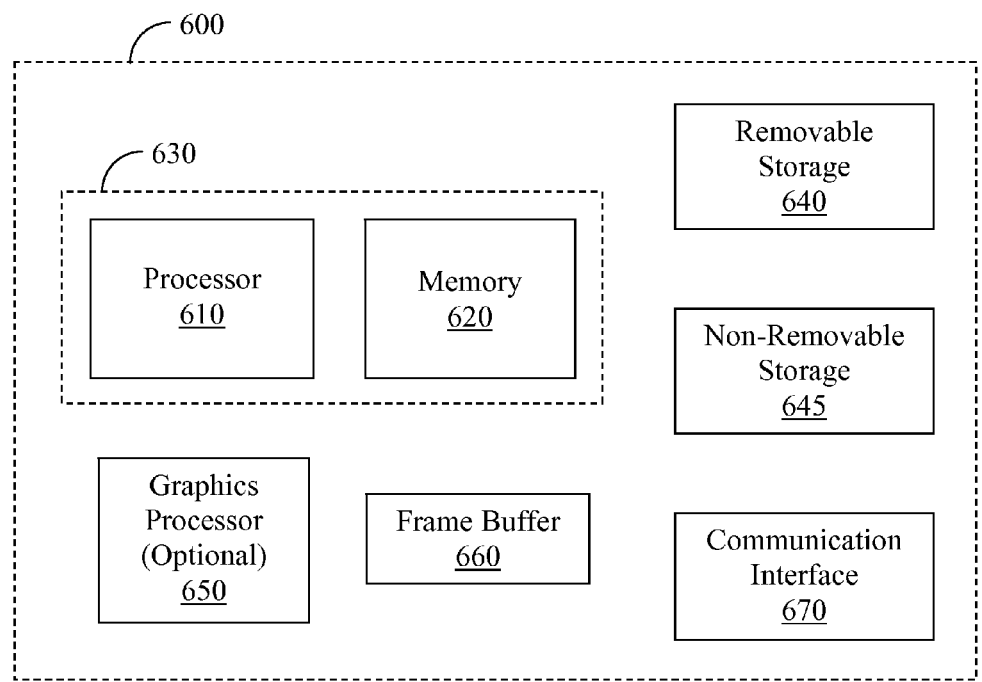
FIG. 6 shows an exemplary computer system platform upon which embodiments of the present invention may be implemented.

FIG. 6 shows exemplary computer system platform 600 upon which embodiments of the present invention may be implemented. As shown in FIG. 6, portions of the present invention may be implemented by execution of computer-readable instructions or computer-executable instructions that may reside in components of computer system platform 600 and which may be used as a part of a general purpose computer network. It is appreciated that computer system platform 600 of FIG. 6 is merely exemplary. As such, the present invention can operate within a number of different systems including, but not limited to, general-purpose computer systems, embedded computer systems, laptop computer systems, hand-held computer systems, portable computer systems, mobile phones, tablet computer systems, e-readers (e.g., capable of rendering an electronic document or book), or stand-alone computer systems.

In one embodiment, computer system platform 600 may be used to implement computer system 110, computer system 120, web server 140, computer system 160, web browsing monitoring component 150, attribute database 170, some combination thereof, etc. And in one embodiment, one or more components of computer system platform 600 may be disposed in and/or coupled with a housing or enclosure.

In one embodiment, depicted by dashed lines 630, computer system platform 600 may include at least one processor 610 and at least one memory 620. Processor 610 may include a central processing unit (CPU) or other type of processor. Depending on the configuration and/or type of computer system environment, memory 620 may include volatile memory (e.g., RAM), non-volatile memory (e.g., ROM, flash memory, etc.), or some combination of the two. Additionally, memory 620 may be removable, non-removable, etc.

In other embodiments, computer system platform 600 may include additional storage (e.g., removable storage 640, non-removable storage 645, etc.). Removable storage 640 and/or non-removable storage 645 may include volatile memory, non-volatile memory, or any combination thereof. Additionally, removable storage 640 and/or non-removable storage 645 may include CD-ROM, digital versatile disks (DVD) or other optical storage, magnetic cassettes, magnetic tape, magnetic disk storage or other magnetic storage devices, or any other medium which can be used to store information for access by computer system platform 600.

As shown in FIG. 6, computer system platform 600 may communicate with other systems, components, or devices via communication interface 670. Communication interface 670 may embody computer-readable instructions, data structures, program modules or other data in a modulated data signal (e.g., a carrier wave) or other transport mechanism. By way of example, and not limitation, communication interface 670 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 670 may also couple computer system platform 600 to one or more input devices (e.g., a keyboard, a mouse, a trackball, a joystick, a pen, a voice input device, a touch input device, etc.). In one embodiment, communication interface 670 may couple computer system platform 600 to one or more output devices (e.g., a display, a speaker, a printer, etc.).

As shown in FIG. 6, graphics processor 650 may perform graphics processing operations on graphical data stored in frame buffer 660 or another memory (e.g., 620, 640, 645, etc.) of computer system platform 600. Graphical data stored in frame buffer 660 may be accessed, processed, and/or modified by components (e.g., graphics processor 650, processor 610, etc.) of computer system platform 600 and/or components of other systems/devices. Additionally, the graphical data may be accessed (e.g., by graphics processor 650) and displayed on an output device coupled to computer system platform 600. Accordingly, memory 620, removable storage 640, non-removable storage 645, fame buffer 660, or a combination thereof, may be a computer-readable medium or computer-usable medium and may include instructions that when executed by a processor (e.g., 610, 650, etc.) implement a method of interacting using content (e.g., in accordance with process 300 of FIGS. 3A, 3B and 3C, in accordance with process 500 of FIGS. 5A, 5B and 5C, etc.).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of interacting using content, said method comprising:

responsive to a phone session between a first computer system and a second computer system over a voice channel, accessing a web response request comprising at least one attribute at said first computer system, wherein said web response request when executed by said first computer system initiates a communication session with a web server over a second data channel and is associated with a web response, and wherein said web response request originates at said second computer system in response to said phone session for purposes of initiating said communication session, and wherein said web response request is delivered from said second computer system to said first computer system over a first data channel; and executing contemporaneously with said phone session said web response at said first computer system based on said at least one attribute, wherein said executing comprises downloading said content from said web server using said second data channel, and wherein said executing further comprises displaying said content on a display device of said first computer system.

2. The method of claim 1, wherein said web server and said second computer system are associated with an enterprise, and wherein said second computer system is associated with a call center of said enterprise.

3. The method of claim 1, wherein said executing is performed responsive to a communication of said web response request delivered from said second computer system to said first computer system via a third computer system, and wherein said request originates from said second computer system and is sent by said second computer system to said third computer system.

4. The method of claim 1, wherein said request is sent by said second computer system directly to said first computer system.

5. The method of claim 1, wherein said at least one attribute is determined by said second computer system based on a phone number associated with said first computer system.

6. The method of claim 1 further comprising:
performing an authentication between said first computer system and said web server.

7. The method of claim 1, wherein said phone session is associated with an interactive voice response session, and wherein said web response is executed contemporaneously with said interactive voice response session.

8. The method of claim 1, further comprising:
accessing another request at said first computer system, wherein said another request is a request to launch an application on said first computer system; and
launching said at least one application on said first computer system.

9. The method of claim 1, further comprising:
initiating a co-browsing session between said first and second computer systems to allow said first and second computer systems to contemporaneously browse said content.

10. A non-transitory computer-readable medium having computer-readable program code embodied therein for causing a computer system to perform a method of interacting using content, said method comprising:
responsive to a commencement of a phone session between a first computer system and a second computer system over a voice channel, accessing a web response request comprising at least one attribute at said first computer system, wherein said web response request when executed by said first computer system initiates a communication session with a web server over a second data channel and is associated with a web response, and wherein said web response request originates at said second computer system in response to said phone session for purposes of initiating said communication session, and wherein said web response request is delivered from said second computer system to said first computer system over a first data channel; and
executing said web response at said first computer system based on said at least one attribute, wherein said executing comprises downloading said content from said web server using said second data channel, and wherein said executing further comprises displaying said content on a display device of said first computer system.

11. The computer-readable medium of claim 10, wherein said web server and said second computer system are associated with an enterprise, and wherein said second computer system is associated with a call center of said enterprise.

12. The computer-readable medium of claim 10, wherein said executing is performed responsive to a communication of said web response request delivered from said second computer system to said first computer system via a third computer system, and wherein said request is sent by said second computer system to said third computer system.

13. The computer-readable medium of claim 10, wherein said request is sent by said second computer system directly to said first computer system.

14. The computer-readable medium of claim 10, wherein said at least one attribute is determined by said second computer system based on a phone number associated with said first computer system.

15. The computer-readable medium of claim 10 further comprising:
performing an authentication between said first computer system and said web server.

16. The computer-readable medium of claim 10, wherein said phone session is associated with an interactive voice response session, and wherein said web response is executed contemporaneously with said interactive voice response session.

17. The computer-readable medium of claim 10 further comprising:
accessing another request at said first computer system, wherein said another request is a request to launch an application on said first computer system; and
launching said at least one application on said first computer system.

18. The computer-readable medium of claim 10 further comprising:
initiating a co-browsing session between said first and second computer systems to allow said first and second computer systems to contemporaneously browse said content.

19. A system comprising a processor and a memory, wherein said memory comprises instructions that when executed by said system implement a method of interacting using content, said method comprising:
responsive to a commencement of a phone session between a first computer system and a second computer system over a voice channel, accessing a web response request comprising at least one attribute at said first computer system, wherein said web response request when executed by said first computer system initiates a communication session with a web server over a second data channel and is associated with a web response, and wherein said web response request originates at said second computer system in response to said phone session for purposes of initiating said communication session, and wherein said web response request is delivered from said second computer system to said first computer system over a first data channel; and
executing said web response at said first computer system based on said at least one attribute, wherein said executing comprises downloading said content from said web server using said second data channel, and wherein said executing further comprises displaying said content on a display device of said first computer system.

20. The system of claim 19, wherein said web server and said second computer system are associated with an enterprise, and wherein said second computer system is associated with a call center of said enterprise.

21. The system of claim 19, wherein said executing is performed responsive to a communication of said web response request delivered from said second computer system to said first computer system via a third computer system, and wherein said request is sent by said second computer system to said third computer system.

22. The system of claim 19, wherein said request is sent by said second computer system directly to said first computer system.

23. The system of claim 19, wherein said at least one attribute is determined by said second computer system based on a phone number associated with said first computer system.

24. The system of claim 19 further comprising:
performing an authentication between said first computer system and said web server.

25. The system of claim 19, wherein said phone session is associated with an interactive voice response session, and wherein said web response is executed contemporaneously with said interactive voice response session.

26. The system of claim 19 further comprising:
accessing another request at said first computer system, wherein said another request is a request to launch an application on said first computer system; and
launching said at least one application on said first computer system.

27. The system of claim 19 further comprising:
initiating a co-browsing session between said first and second computer systems to allow said first and second computer systems to contemporaneously browse said content.

\* \* \* \* \*